US011939146B2

(12) United States Patent
Garg et al.

(10) Patent No.: US 11,939,146 B2
(45) Date of Patent: Mar. 26, 2024

(54) SILO BAGS WITH NON-UNIFORM THICKNESS AND METHODS OF PRODUCING

(71) Applicants: Dow Global Technologies LLC, Midland, MI (US); PBBPolisur S.R.L., Buenos Aires (AR)

(72) Inventors: Akanksha Garg, Pearland, TX (US); Ashishkumar S. Lokhande, Mumbai (IN); Pavan Kumar Valavala, Missouri City, TX (US); Jose Eduardo Ruiz, Sugar Land, TX (US); Maximiliano Zanetti, Bahia Blanca (AR); Kurt A. Koppi, Midland, MI (US)

(73) Assignees: Dow Global Technologies LLC, Midland, MI (US); PBBPolisur S.R.L., Buenos Aires (AR)

( * ) Notice: Subject to any disclaimer, the term of this patent is extended or adjusted under 35 U.S.C. 154(b) by 353 days.

(21) Appl. No.: 17/311,457

(22) PCT Filed: Nov. 14, 2019

(86) PCT No.: PCT/US2019/061446
§ 371 (c)(1),
(2) Date: Jun. 7, 2021

(87) PCT Pub. No.: WO2020/123091
PCT Pub. Date: Jun. 18, 2020

(65) Prior Publication Data
US 2022/0024686 A1   Jan. 27, 2022

Related U.S. Application Data

(60) Provisional application No. 62/777,978, filed on Dec. 11, 2018.

(51) Int. Cl.
*B32B 1/08* (2006.01)
*B32B 3/26* (2006.01)
(Continued)

(52) U.S. Cl.
CPC ............ *B65D 88/1618* (2013.01); *B32B 1/08* (2013.01); *B32B 3/263* (2013.01); *B32B 27/08* (2013.01);
(Continued)

(58) Field of Classification Search
CPC .............. B32B 27/08; B32B 2307/308; B32B 2307/72; B32B 2307/732; B32B 2439/06
(Continued)

(56) References Cited

U.S. PATENT DOCUMENTS 3,645,992 A   2/1972   Elston
3,914,342 A   10/1975  Mitchell
(Continued)

FOREIGN PATENT DOCUMENTS

CA    2784981 C      9/2017
CN    105856772 A    8/2016
(Continued)

OTHER PUBLICATIONS

International Search Report and Written Opinion pertaining to PCT/US2019/061446, dated Feb. 18, 2020.
(Continued)

*Primary Examiner* — Peter N Helvey
(74) *Attorney, Agent, or Firm* — Dinsmore & Shohl LLP

(57) ABSTRACT

Embodiments of the present disclosure are directed to multilayer silo bags that may include a tube comprising at least two layers, a first open end, a second open end, and a first region and a second region disposed between the first and second end. One or more of the at least three layers may comprise an ethylene/alpha-olefin interpolymer having a
(Continued)

density of 0.90 g/cc to 0.965 g/cc and an $I_2$ of 0.1 to 6.0 g/10 minutes, a low density ethylene-based polymer having a density of 0.917 g/cc to 0.935 g/cc and an $I_2$ of 0.1 to 2.0 g/10 minutes, or combinations thereof. The first region may have a thickness of at least 10% greater than a thickness of the second region. The first region may have a surface area that is at least 50% of an overall surface area of the multilayer silo bag.

15 Claims, 7 Drawing Sheets

(51) Int. Cl.
  *B32B 27/08* (2006.01)
  *B32B 27/32* (2006.01)
  *B65D 88/16* (2006.01)

(52) U.S. Cl.
  CPC ...... *B32B 27/327* (2013.01); *B32B 2307/308* (2013.01); *B32B 2307/72* (2013.01); *B32B 2307/732* (2013.01); *B32B 2439/06* (2013.01)

(58) Field of Classification Search
  USPC .......................................................... 383/109
  See application file for complete search history.

(56) References Cited

U.S. PATENT DOCUMENTS

| | | | |
|---|---|---|---|
| 4,076,698 A | 2/1978 | Anderson et al. | |
| 4,599,392 A | 7/1986 | Mckinney et al. | |
| 5,272,236 A | 12/1993 | Lai et al. | |
| 5,278,272 A | 1/1994 | Lai et al. | |
| 5,518,801 A * | 5/1996 | Chappell | A61F 13/51104 |
| | | | 428/167 |
| 5,582,923 A | 12/1996 | Kale et al. | |
| 5,733,155 A | 3/1998 | Sagawa | |
| 5,854,045 A | 12/1998 | Fang et al. | |
| 7,371,699 B2 | 5/2008 | Bryniarski | |
| 8,079,182 B1 * | 12/2011 | Higgins | E04H 7/24 |
| | | | 52/2.25 |
| 8,835,567 B2 * | 9/2014 | Demirors | C08L 23/14 |
| | | | 525/240 |
| 2012/0295070 A1 * | 11/2012 | Eggers | B32B 7/12 |
| | | | 428/316.6 |
| 2016/0279909 A1 * | 9/2016 | Zanetti | B65D 88/1606 |
| 2017/0021594 A1 * | 1/2017 | Soliman | B32B 9/045 |
| 2017/0129222 A1 * | 5/2017 | Baralon | B32B 27/306 |
| 2017/0182728 A1 * | 6/2017 | DePlace | B29C 65/004 |
| 2017/0326852 A1 * | 11/2017 | Chow | C08J 5/18 |
| 2018/0009205 A1 | 1/2018 | Hoenigmann | |
| 2019/0001649 A1 * | 1/2019 | Mattsson | B32B 27/306 |
| 2021/0146663 A1 * | 5/2021 | Baccaro | A23K 30/10 |
| 2021/0274718 A1 * | 9/2021 | Cheret | B32B 27/34 |
| 2023/0126009 A1 * | 4/2023 | Hugi | B32B 27/20 |
| | | | 428/516 |
| 2023/0276746 A1 * | 9/2023 | Frysali | B32B 27/306 |
| | | | 523/123 |

FOREIGN PATENT DOCUMENTS

| | | |
|---|---|---|
| DE | 1454996 B | 4/1969 |
| FR | 156897 A | 5/1969 |
| GB | 1233588 | 5/1971 |
| JP | 49031542 B1 | 8/1974 |
| JP | 2017220274 A | 12/2017 |
| RU | 2553911 C2 | 6/2015 |
| WO | 2018115224 A1 | 6/2018 |

OTHER PUBLICATIONS

Japanese Office Action, dated Aug. 29, 2023, pertaining to Japanese Patent Application No. 2021-533571, 5 pgs.
International Preliminary Report on Patentability for Application No. PCT/US2019/061446, dated Jun. 8, 2021, pp. 1-7.
Communication pursuant to Rules 161 (1) and 162 for EP Application No. 19817866.7, dated Jul. 20, 2021, pp. 1-3.

* cited by examiner

SILO BAGS WITH NON-UNIFORM THICKNESS AND METHODS OF PRODUCING

CROSS-REFERENCE TO RELATED APPLICATIONS

This application is a National Stage Entry under 35 U.S.C. § 371 of International Patent Application No. PCT/US2019/061446, filed Nov. 14, 2019, which claims priority to U.S. Provisional Patent Application No. 62/777,978, filed on Dec. 11, 2018, the entire disclosures of which are hereby incorporated by reference.

TECHNICAL FIELD

Embodiments described herein generally relate to silo bags and specifically relate to silo bags having non-uniform thickness.

BACKGROUND

Silo bags (which may be referred to as "silage bags") may include bags used for storage solutions, which may be made of polymeric films. Silo bag may often be used in agricultural applications. For example, silo bags may be used for the bulk storage of grains, or "silage" in farmland.

SUMMARY

During use, a silo bag may become deformed, for example, by filling the silo bag with silage. Such deformation of a silo bag may put strain on the silo bag. In some cases, the strain placed on the silo bag may become localized on a particular region of the silo bag. This localized strain may be referred to as "necking."

In these necking regions, longitudinal thinning of the polymeric film may occur. Longitudinal thinning may refer to localized thinning that occurs along the length of the silo bag resulting from excessive deformation. In some examples, the zone affected by longitudinal thinning may have a thickness reduction of greater than 50%. Additionally, longitudinal thinning may lead to a variety of other performance issues for silo bags. For example, longitudinal thinning may reduce the puncture resistance of the silo bag.

Accordingly, there are needs for silo bags with improved resistance to localized strain and improved resistance to longitudinal thinning.

Embodiments of the present disclosure meet those needs by providing silo bags with non-uniform thickness. The non-uniform thickness of the presently-disclosed silo bags may improve the performance of the silo bags as compared to silo bags with uniform thickness. Embodiments of the presently-described silo bags having non-uniform thickness may further improve the performance of the silo bag without requiring additional materials. As described herein, in some embodiments, the thickness of the silo bag may be increased in the regions of the silo bag that may be most susceptible to stress. Additionally, in some embodiments, the thickness of the silo bag may be decreased in the regions of the silo bag that may be less susceptible to stress. As such, in embodiments of the present disclosure, the amount of material used to make the non-uniform silo bags may be kept constant.

According to at least one embodiment of the present disclosure, a multilayer silo bag is provided. Embodiments of the multilayer silo bags may include a tube comprising at least two layers, the tube having a first open end, a second open end, a first region disposed between the first open end and the second open end, and a second region disposed between the first open end and the second open end. Each of the at least two layers may include an ethylene/alpha-olefin interpolymer having a density of 0.90 grams per cubic centimeter (g/cc) to 0.965 g/cc when measured according to ASTM D792 and a melt index ($I_2$) of 0.1 to 6.0 grams (g)/10 minutes when measured according to ASTM D1238, a low density ethylene-based polymer having a density of 0.917 g/cc to 0.935 g/cc and melt index ($I_2$) of 0.1 to 2.0 g/10 minutes, or combinations thereof. The first region may have a thickness of at least 10% greater than a thickness of the second region. The first region may have a surface area that is at least 50% of an overall surface area of the multilayer silo bag. The tube may have an overall thickness of 50 micrometers (μm) to 350 micrometers μm.

According to at least another embodiment of the present disclosure, a method of manufacturing a multilayer silo bag is provided. Embodiments of the method may include forming a multilayer layer blown film bubble and cutting the multilayer blown film bubble to form a multilayer silo bag. The multilayer layer blown film bubble may include at least three layers. Each of the at least three layers may include an ethylene/alpha-olefin interpolymer having a density of 0.90 g/cc to 0.965 g/cc and a melt index ($I_2$) of 0.1 to 6.0 g/10 minutes, a low density ethylene-based polymer having a density of 0.917 g/cc to 0.935 g/cc and melt index ($I_2$) of 0.1 to 2.0 g/10 minutes, or combinations thereof. The multilayer silo bag may include a tube having a first open end, a second open end, a first region, and a second region. The first region may have a thickness of at least 10% greater than a thickness of the second region. The first region may have a surface area that is 50% of an overall surface area of the multilayer silo bag. The tube may have an overall thickness of 50 μm to 350 μm.

As such, embodiments of the present disclosure may provide silo bags with improved the performance, as compared to conventional silo bags with uniform thickness, without requiring additional materials.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
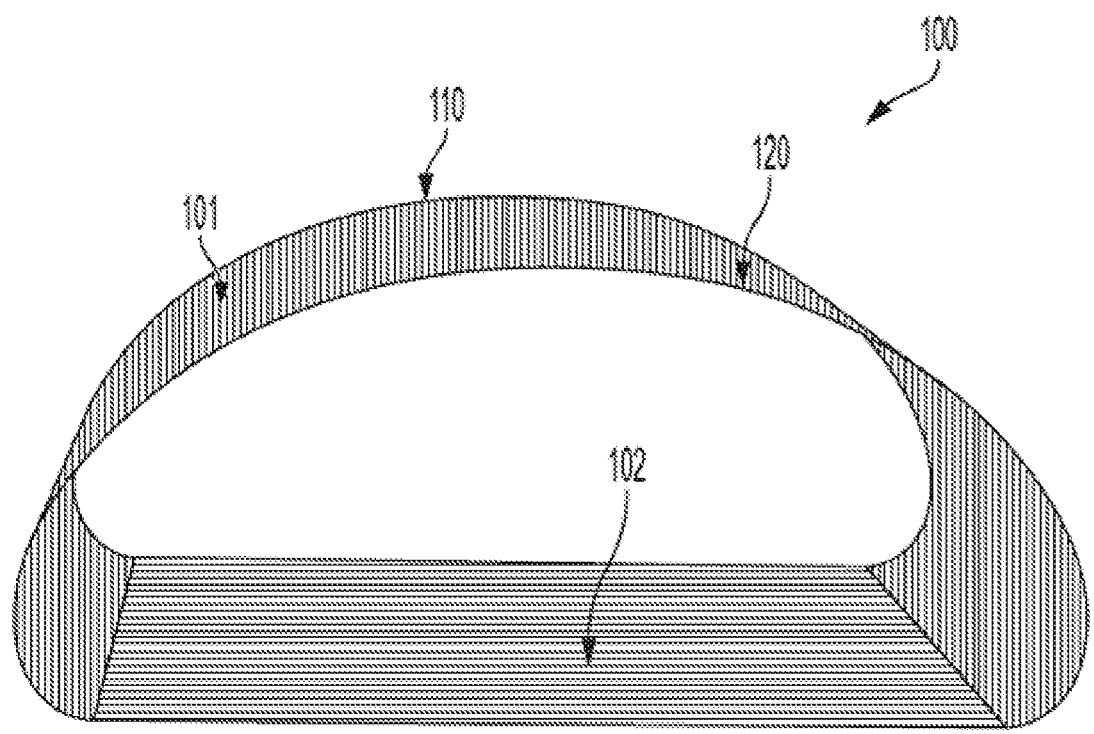
FIG. 1 is a schematic depiction of a silo bag having non-uniform thickness in accordance with one or more embodiments of the present disclosure.

Specific embodiments of the present application will now be described. These embodiments are provided so that this disclosure will be thorough and complete and will fully convey the scope of the subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 to 0.940 g/cc.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. Nos. 3,914,342 and 5,854,045). The LLDPE resins can be made via gas-phase, solution-phase, or slurry polymerization or any combination thereof, using any type of reactor or reactor configuration known in the art.

"Multilayer structure" means any structure having more than one layer. For example, the multilayer structure (for example, a film) may have two, three, four, five, or more layers. A multilayer structure may be described as having the layers designated with letters. For example, a three layer structure designated as A/B/C may have a core layer, B, and two external layers, A and C. Likewise, a structure having two core layers, B and C, and two external layers, A and D, would be designated A/B/C/D. In some embodiments, a multilayer film of the present disclosure comprises up to 13 layers.

Reference will now be made in detail to embodiments of silo bags having non-uniform thickness as described herein. Embodiments of the presently-described silo bags may include one or more layers that form a tubular-shaped structure having two open ends, which may be referred to herein as a "tube." In some embodiments, the tube may include one or more layers. The tube may have a first open end, a second open end, where a first region and a second region may be disposed between the first open end the second open end.

In some embodiments, the silo bag may be a "monolayer silo bag," which refers to a silo bag where a single layer film may form the tube. In some embodiments, the silo bag may be a "multilayer silo bag," which refers to a silo bag where a film having multiple layers that form the tube. The film used to form the tube may have one or more layers, two or more layers, three or more layers, or up to fifteen layers. In some embodiments, the multilayer silo bag may be formed via an extrusion process, as described subsequently in this disclosure.

Reference will now be made in detail to embodiments of various silo bags having non-uniform thickness. Referring to FIG. 1, a multilayer silo bag 100 may include a tube comprising at least two layers, the tube having a first open end 110, a second open end 120, and a first region 101 and a second region 102 disposed between the first open end 110 and the second open end 120. Each of the at least two layers may include an ethylene/alpha-olefin interpolymer having a density of 0.905 g/cc to 0.935 g/cc when measured according to ASTM D792 and a melt index ($I_2$) of 0.1 to 2.0 g/10 minutes when measured according to ASTM D1238. Each of the at least two layers may also include a low density ethylene-based polymer having a density of 0.917 g/cc to 0.935 g/cc and melt index ($I_2$) of 0.1 to 2.0 g/10 minutes, or combinations thereof. The first region 101 may have a thickness of at least 10% greater than a thickness of the second region 102. The first region 101 may have a surface area that is at least 50% of an overall surface area of the multilayer silo bag 100. The tube may have an overall thickness of 50 μm to 350 μm.

In some embodiments, each of the one or more layers may include an ethylene/alpha-olefin interpolymer. In embodiments, the ethylene/alpha-olefin interpolymer may have a density of from about 0.860 g/cc to about 0.965 g/cc when measured according to ASTM D792. In other embodiments, the ethylene/alpha-olefin interpolymer may have a density of from about 0.860 g/cc to about 0.940 g/cc, from about 0.860 g/cc to about 0.930 g/cc, from about 0.905 g/cc to about 0.965 g/cc, from about 0.905 g/cc to about 0.940 g/cc, from about 0.905 g/cc to about 0.930 g/cc, from about 0.910 g/cc to about 0.965 g/cc, from about 0.910 g/cc to about 0.940 g/cc, or from about 0.910 g/cc to about 0.930 g/cc. In embodiments, the ethylene/alpha-olefin interpolymer may have a melt index ($I_2$) of from about 0.1 to about 2.0 g/10 minutes when measured according to ASTM D1238. In other embodiments, the ethylene/alpha-olefin interpolymer may have a melt index ($I_2$) of from about 0.1 to about 1.5 g/10 minutes. In some embodiments, the ethylene/alpha-olefin interpolymer may be a linear low density ethylene-based polymer (LLDPE).

Various methodologies are contemplated for producing the ethylene/alpha-olefin interpolymer. For example, ethylene/alpha-olefin interpolymers are generally prepared using Ziegler-Natta catalysts, chrome catalysts or single-site catalysts including, but not limited to, bis-metallocene catalysts and constrained geometry catalysts.

Each of the one or more layers may include, in embodiments, a low density ethylene-based polymer (LDPE) that may have a density of 0.917 g/cc to 0.935 g/cc when measured according to ASTM D792. In other embodiments, the low density ethylene-based polymer (LDPE) may have a density of from about 0.917 g/cc to about 0.93 g/cc, from about 0.917 g/cc to about 0.920 g/cc, from about 0.917 g/cc to about 0.910 g/cc, from about 0.920 g/cc to about 0.935 g/cc, from about 0.920 g/cc to about 0.930 g/cc, from about 0.930 g/cc to about 0.935 g/cc. In embodiments, the low density ethylene-based polymer (LDPE) may have a melt index ($I_2$) of from about 0.1 to about 6.0 g/10 minutes when measured according to ASTM D1238. In other embodiments, the low density ethylene-based polymer (LDPE) may have a melt index ($I_2$) of from about 0.1 to about 5.0 g/10 minutes, from about 0.1 to about 4.0 g/10 minutes, from about 0.1 to about 3.0 g/10 minutes or from about 0.1 to about 2.0 g/10 minutes or from about 0.1 to about 1.5 g/10 minutes.

In one or more embodiments, the LDPE compositions may include antiblock agent, slip agent, or both. Various commercial LDPE products are considered suitable for use in the one or more layers. Such commercial LDPE products may include AGILITY™ EC7000, AGILITY™ EC7220, DOW™ LDPE 7008 and DOW™ LDPE 7004, all of which are available from The Dow Chemical Company (Midland, MI).

In monolayer and multilayer films, which may include blown or cast films, it may be beneficial for the films to have processability, stiffness and toughness. In embodiments, and LDPE may be blended with an ethylene/alpha-olefin interpolymer, as LDPE can improve the melt strength, and thereby improve processability.

It is contemplated that the one or more layers may include an ethylene/alpha-olefin interpolymer, a low density ethylene-based polymer (LDPE), or combinations thereof.

As stated above, it is contemplated that the one or more layers of the silo bag may include at least 40 wt. % ethylene/alpha-olefin interpolymer based on the total weight of the one or more layers. In other embodiments, the one or more layers may include from about 40 wt. % to about 95 wt. %, from about 40 wt. % to about 80 wt. %, from about 40 wt. % to about 70 wt. %, from about 40 wt. % to about 60 wt. %, from about 40 wt. % to about 50 wt. %, from about 50 wt. % to about 95 wt. %, from about 50 wt. % to about 80 wt. %, from about 50 wt. % to about 70 wt. %, from about 50 wt. % to about 60 wt. %, from about 60 wt. % to about 95 wt. %, from about 60 wt. % to about 80 wt. %, from about 60 wt. % to about 70 wt. %, from about 70 wt. % to about 95 wt. %, from about 70 wt. % to about 80 wt. %, or from about 80 wt. % to about 95 wt. % ethylene/alpha-olefin interpolymer based on the total weight of the one or more layers. In some embodiments, the ethylene/alpha-olefin interpolymer may be a linear low density ethylene-based polymer (LLDPE). In other embodiments, the one or more layers may include from about 40 wt. % to about 95 wt. % LLDPE.

In some embodiments, it is contemplated that the one or more layers may include low density ethylene-based polymer. It is contemplated that the one or more layers may include at least 10 wt. % low density ethylene-based polymer based on the total weight of the one or more layers. In other embodiments, the one or more layers may include from about 10 wt. % to about 60 wt. %, from about 10 wt. % to about 50 wt. %, from about 10 wt. % to about 40 wt. %, from about 10 wt. % to about 30 wt. %, from about 10 wt. % to about 20 wt. %, from about 20 wt. % to about 60 wt. %, from about 20 wt. % to about 50 wt. %, from about 20 wt. % to about 40 wt. %, from about 20 wt. % to about 30 wt. %, from about 30 wt. % to about 60 wt. %, from about 30 wt. % to about 50 wt. %, from about 30 wt. % to about 40 wt. %, from about 40 wt. % to about 60 wt. %, from about 40 wt. % to about 50 wt. %, or from about 50 wt. % to about 60 wt. % low density ethylene-based polymer based on the total weight of the one or more layers.

As stated previously, embodiments of the silo bag may include a tube having a first region and a second region disposed between the first open end the second open end. In embodiments, the first region may have a thickness that is different than the thickness of the second region. As such, the thickness of the silo bags may be considered "non-uniform."

Without being bound by theory, silo bags having non-uniform thickness as described herein, may be more resistant to necking. As used herein, a "necking" may refer to relatively large amounts of strain that localize disproportionately in a particular region of the silo bag. A necking region may further refer to a region of a film having longitudinal thinning. Longitudinal thinning may refer to a region with localized thickness reduction of greater than 15%, greater than 25%, greater than 50%, or greater than 75%. A necking region may also refer to a region of a film having a localized strain of greater than 15%, greater than 25%, greater than 50%, or greater than 75%. A silo bag may be considered to have failure if it includes necking.

According to embodiments of the present disclosure, silo bags having non-uniform thickness may be more resistant to failure as compared to silo bags having uniform thickness. For conventional silo bags having uniform thickness, strain may become localized disproportionately in a particular region of the silo bag, known as necking. For example, when a silo bag having uniform thickness becomes filled with grain or silage, the weight of the grain may cause filled bag may deform. As stated previously, a "silo bag" may be alternatively referred to as a "silage bag." When the silo bag is filled with silage, the grain movement under gravity typically causes the silo bag to stretch at the top portion of the bag. As the filled bag deforms, the strain may become localized in the top portion of the silo bag having uniform thickness, resulting in necking, and subsequently, leading to failure of the silo bag.

In embodiments of the present disclosure, the silo bag having non-uniform thickness may be resistant to localized stress or necking. In embodiments of the silo bags described herein, the first region may be more susceptible to strain. As such, in embodiments, the thickness of first region may be increased to strengthen the silo bag so that the strain does not become localized, leading to necking and subsequent failure. For example, increasing the thickness of the top region of the silo bag may result in a higher cross-section of silage in the top of the filled silo bag, which may reduce the tendency of localized thinning and improve the load capacity. The region of the bag touching the ground (which may be referred to as the bottom region of the bag) may be under compressive stresses due to grains when the bag is filled. Reducing the thickness of this region would not significantly alter the bag performance. One of the causes of the failure at the bottom of a silo bag may include puncture by objects such as stones and other debris. However, reducing the thickness of the bottom region by about 10% to about 20% may not result in significant change in performance if there are stones or sharp objects under the bag. Moreover, a greater thickness of the first region may provide improved creep resistance and prevent flattening of the bags, for example when the silo bags may be stored for long periods of time.

As stated previously, in embodiments, the first region may have a thickness that is different than a thickness of the second region. In some embodiments, the thickness of the first region may be about at least 10% greater than the thickness of the second region. In other embodiments, the thickness of the first region may be from about 10% greater to about 50% greater than the thickness of the second region, from about 10% greater to about 40% greater than the thickness of the second region, from about 10% greater to about 30% greater than the thickness of the second region, from about 10% greater to about 20% greater than the thickness of the second region, from about 20% greater to about 50% greater than the thickness of the second region, from about 20% greater to about 40% greater than the thickness of the second region, from about 20% greater to about 30% greater than the thickness of the second region, from about 30% greater to about 50% greater than the thickness of the second region, from about 30% greater to about 40% greater than the thickness of the second region, or from about 40% greater to about 50% greater than the thickness of the second region.

In embodiments, the silo bag having non-uniform thickness may be resistant to localized stress or necking. However, if the first region has a thickness that is more than 50% greater than the thickness of the second region, when filled with silage, the grain movement under gravity may cause stretching where the first region contacts the second region. As such, the stretching in these areas may cause localized stress or necking.

The first region may have a surface area that is at least 50% of an overall surface area of the silo bag. In other embodiments, the first region may have a surface area that is at least 65%, 75%, 85% or 95% of an overall surface area of the silo bag. In embodiments, the second region may have a surface area that is less than 50% of an overall surface area of the silo bag. In other embodiments, the second region may have a surface area that is less than 35%, 25%, 15% or 5% of an overall surface area of the silo bag.

In some embodiments, the first region may have a thickness of from about 50 µm to about 350 µm. In other embodiments, the first region may have a thickness of from about 50 lam to about 300 µm, 50 µm to about 250 µm, from about 50 µm to about 200 µm, from about 50 lam to about 150 µm, from about 50 µm to about 100 µm, from about 100 µm to about 300 µm, from about 100 µm to about 250 µm, from about 100 µm to about 200 µm, from about 100 µm to about 150 µm, from about 150 µm to about 300 µm, from about 150 µm to about 250 µm, from about 150 µm to about 200 µm, from about 200 µm to about 300 µm, from about 200 µm to about 250 µm, or from about 200 µm to about 250 µm.

In some embodiments, the second region may have a thickness of from about 50 lam to about 350 µm. In other embodiments, the second region may have a thickness of from about 50 µm to about 300 µm, 50 µm to about 250 µm, from about 50 µm to about 200 µm, from about 50 µm to about 150 µm, from about 50 µm to about 100 µm, from about 100 µm to about 300 µm, from about 100 µm to about 250 µm, from about 100 µm to about 200 µm, from about 100 µm to about 150 µm, from about 150 µm to about 300 µm, from about 150 µm to about 250 µm, from about 150 µm to about 200 µm, from about 200 µm to about 300 µm, from about 200 µm to about 250 µm, or from about 200 µm to about 250 µm.

In embodiments, the thickness of the first region may have a constant thickness. In other embodiments, the first region may have a thickness that gradually decreases from a midpoint of the first region towards a midpoint of the second region. In embodiments, the thickness of the second region may have a constant thickness. In other embodiments, the first region may have a thickness that gradually increases from a midpoint of the second region towards a midpoint of the first region.

As stated above, decreasing the thickness of a region with the least stress may allow embodiments of the silo bags having non-uniform thickness to be resistant to necking without requiring additional material. In embodiments, the silo bag having non-uniform thickness may have an "overall weight," which includes the combined weight of the first region and the second region. As compared to a silo bag having uniform thickness, the weight of the silo bag having uniform thickness may be the same as the overall weight of the silo bag having non-uniform thickness. In embodiments, the silo bag having non-uniform thickness includes a tube that may have an overall thickness of about 50 µm to about 350 µm. As used herein, "overall thickness" refers to the average thickness of the silo bag overall, including both a first region and a second region. In other embodiments, the overall thickness may be from about 50 µm to about 250 µm, from about 50 µm to about 150 µm, from about 50 µm to about 100 µm, from about 100 µm to about 350 µm, from about 100 µm to about 250 µm, from about 100 µm to about 150 µm, from about 200 µm to about 350 µm, from about 200 µm to about 250 µm, or from about 300 µm to about 350 µm.

Various methods of producing embodiments of the silo bags would be familiar to one of ordinary skill in the art. Reference will now be made in detail to various embodiments of processes of manufacturing various silo bags having non-uniform thickness.

In one or more embodiments, the process of manufacturing a silo bag may include forming a blown film bubble. In some embodiments, the blown film bubble may be a multilayer blown film bubble. Further in accordance with this embodiment, the multilayer blown film bubble may include at least two layers, and the at least two layers may adhere to each other. In some embodiments, each of the at least two layers may include an ethylene/alpha-olefin interpolymer, a low density ethylene-based polymer, or combinations thereof as described previously in this disclosure.

In some embodiments, the bubble size of the process may be blown to a length of approximately 300 feet (ft.) (approximately 91.44 meters). In other embodiments, the bubble size may be blown to a length of from about 50 ft. to about 300 ft., from about 50 ft. to about 250 ft., from about 50 ft. to about 200 ft., from about 50 ft. to about 150 ft., from about 50 ft. to about 100 ft., from about 100 ft. to about 300 ft., from about 100 ft. to about 250 ft., from about 100 ft. to about 200 ft., from about 100 ft. to about 150 ft., from about 150 ft. to about 300 ft., from about 150 ft. to about 250 ft., from about 150 ft. to about 200 ft., from about 200 ft. to about 300 ft., from about 200 ft. to about 250 ft., or from about 250 ft. to about 300 ft.

During embodiments of the blown film process, an extruded film from an extruder die may be formed (blown) and pulled up a tower onto a nip. The film may then be wound onto a core. Before the film is wound onto the core, the ends of the film may be cut and folded using folding equipment. This makes the layers of the film difficult to separate, which may be important for agricultural applications, generally, or silage bag applications.

In further embodiments, the blown film bubble may be formed via a blown film extrusion line having a length to diameter ("L/D") ratio of from 30 to 1. In some embodiments, the extrusion line may have a blow up ratio of from about 1 to about 5, from about 1 to about 3, from about 2 to about 5, or from about 2 to about 3. In some embodiments, the extrusion line may utilize a die with internal bubble cooling. In some embodiments, the die gap may be from about 1 millimeter (mm) to about 5 mm, from about 1 mm to about 3 mm, from about 2 mm to about 5 mm, or from about 2 mm to about 3 mm. In some embodiments, extruding the multilayer layer blown film bubble through the die comprises changing the die design to inherently change the thickness distribution of the extruded film. In some embodiments, extruding the multilayer layer blown film bubble through the die comprises offsetting the center of the die. In embodiments, offsetting the center of the die may cause the film to have a non-uniform thickness as it is extruded through the die.

In some embodiments, the extrusion line may utilize a film thickness gauge scanner. In some embodiments, during the extrusion process, the film thickness may be maintained at about from about 50 μm to about 350 μm. In other embodiments, the film thickness may be from about 50 μm to about 300 μm, 50 μm to about 250 μm, from about 50 μm to about 200 μm, from about 50 μm to about 150 μm, from about 50 μm to about 100 μm, from about 100 lam to about 300 μm, from about 100 μm to about 250 μm, from about 100 μm to about 200 μm, from about 100 μm to about 150 μm, from about 150 μm to about 300 μm, from about 150 μm to about 250 μm, from about 150 μm to about 200 μm, from about 200 μm to about 300 μm, from about 200 μm to about 250 μm, or from about 200 μm to about 250 μm.

In some embodiments, the frost line height may be from about 25 inches to about 40 inches, from about 25 inches to about 35 inches, from about 25 inches to about 35 inches, from about 25 inches to about 30 inches, from about 30 inches to about 40 inches, from about 30 inches to about 35 inches, or from about 35 inches to about 40 inches.

In some embodiments, the forming of the multilayer layer blown film bubble step may occur at a temperature of from 350 to 500° F., or from 375 to 475° F. The output speed may be from about 5 lb/hr/in to about 25 lb/hr/in, from about 5 lb/hr/in to about 20 lb/hr/in, from about 5lb/hr/in to about 15 lb/hr/in, from about 5lb/hr/in to about 10 lb/hr/in, from about 10 lb/hr/in to about 25 lb/hr/in, from about 10 lb/hr/in to about 20 lb/hr/in, from about 10 lb/hr/in to about 15 lb/hr/in, from about 15 lb/hr/in to about 25 lb/hr/in, from about 15 lb/hr/in to about 20 lb/hr/in, or from about 20 lb/hr/in to about 25 lb/hr/in.

In other embodiments, the process of manufacturing a multilayer silo bag may further include laminating a second film onto at least a portion of the surface of the multilayer silo bag. In embodiments, the second film may cause the silo bag to have a non-uniform thickness.

In some embodiments, one or more of the foregoing silo bags having non-uniform thickness may be utilized in storage solution applications. In further embodiments one or more of the foregoing silo bags having non-uniform thickness may be utilized in agricultural applications.

Test Methods

The test methods include the following:

Melt Index ($I_2$)

To test the melt index ($I_2$), ethylene-based polymer samples are measured according to ASTM D1238 at 190° C. at 2.16 kg. The values are reported in g/10 min, which corresponds to grams eluted per 10 minutes. Propylene-based polymers are measured according to ASTM D1238 at 230° C. at 2.16 kg.

Density

To test the density, samples are prepared and measured according to ASTM D4703 and reported in grams/cubic centimeter (g/cc or g/cm$^3$). Measurements are made within one hour of sample pressing using ASTM D792, Method B.

ASTM D1922 MD (Machine Direction) and CD (Cross Direction) Elmendorf Tear Type B The Elmendorf Tear test determines the average force to propagate tearing through a specified length of plastic film or non rigid sheeting, after the tear has been started, using an Elmendorf-type tearing tester.

After film production from the sample to be tested, the film was conditioned for at least 40 hours at 23° C. (+/−2° C.) and 50% R.H (+/−5) as per ASTM standards. Standard testing conditions were 23° C. (+/−2° C.) and 50% R.H (+/−5) as per ASTM standards.

The force, in grams, required to propagate tearing across a film or sheeting specimen was measured, using a precisely calibrated pendulum device. In the test, acting by gravity, the pendulum swung through an arc, tearing the specimen from a precut slit. The specimen was held on one side by the pendulum, and on the other side by a stationary member. The loss in energy by the pendulum was indicated by a pointer or by an electronic scale. The scale indication was a function of the force required to tear the specimen.

The sample specimen geometry used in the Elmendorf tear test was the 'constant radius geometry,' as specified in ASTM D1922. Testing is typically carried out on specimens that have been cut from both the film MD and CD directions. Prior to testing, the film specimen thickness was measured at the sample center. A total of 15 specimens per film direction were tested, and the average tear strength and average thickness reported. The average tear strength was normalized to the average thickness.

ASTM D882 MD and CD, 1% and 2% Secant Modulus

The film MD (Machine Direction) and CD (Cross Direction) secant modulus was determined per ASTM D882. The reported secant modulus value was the average of five measurements.

Puncture Strength

The Puncture test determines the resistance of a film to the penetration of a probe, at a standard low rate, a single test velocity. The puncture test method is based on ASTM D5748. After film production, the film was conditioned for at least 40 hours at 23° C. (+/−2° C.) and 50% R.H (+/−5), as per ASTM standards. Standard testing conditions are 23° C. (+/−2° C.) and 50% R.H (+/−5) as per ASTM standards. Puncture was measured on a tensile testing machine. Square specimens were cut from a sheet, to a size of "6 inches by 6 inches." The specimen was clamped in a "4 inch diameter" circular specimen holder, and a puncture probe was pushed into the centre of the clamped film, at a cross head speed of 10 inches/minute. The internal test method follows ASTM D5748, with one modification. It deviated from the ASTM D5748 method, in that the probe used, was a "0.5 inch diameter" polished steel ball on a "0.25 inch" support rod (rather than the 0.75 inch diameter, pear shaped probe specified in D5748).

There was a "7.7 inch" maximum travel length to prevent damage to the test fixture. There was no gauge length; prior to testing, the probe was as close as possible to, but not touching the specimen. A single thickness measurement was made in the centre of the specimen. For each specimen, the maximum force, the force at break, the penetration distance, and the energy to break were determined. A total of five specimens were tested to determine an average puncture value. The puncture probe was cleaned using a "Kim-wipe" after each specimen.

ASTM D882 MD and CD, Break Stress, Peak Load, Strain at Break, Strain at Yield, Stress at Yield The film MD (Machine Direction) and CD (Cross Direction) tensile properties: break stress, peak load, strain at break and yield, stress at yield was determined per ASTM D882. The reported tensile properties were the average of five measurements.

EXAMPLES

The following examples illustrate features of the present disclosure but are not intended to limit the scope of the disclosure. The following experiments analyzed the performance of embodiments of silo bags described herein.

3D simulations were used to test the deformation of embodiments of grain-filled silo bags having non-uniform thickness as compared to grain-filled silo bags having uniform thickness. The simulations were modeled using Abaqus Unified FEA Explicit (Product of Simulia™ by Dassault Systémes®).

The silo bags were simulated to be a 12 ft. (approximately 3.65 m) diameter and 3 ft. (approximately 0.91 m) long silo bag with approximately 95% of the bag volume filled with grains (having the properties described above) on a rigid floor. The film modeled for the Examples below had 7 layers and the following composition: 45 wt. % of an LLDPE resin blend having a density of 0.919 g/cc and a melt index of 0.53 g/10 minutes; and 55 wt. % of an LDPE resin with a density of 0.92 g/cc and a melt index of 0.25 g/10 minutes. The blown film properties used for the model are provided in the Tables 1-3.

TABLE 1

| Blown Film Properties. | |
| --- | --- |
| Normalized tear (MD) | 492 gf |
| Normalized tear (CD) | 588 gf |
| Puncture Strength | 30 ft * lbf/in^3 |
| Secant Modulus - MD at 2% strain | 21830 psi |
| Secant Modulus - CD at 2% strain | 25751 psi |

TABLE 2

| Tensile Cross Direction (CD). | |
| --- | --- |
| CD - Break Stress | 1787 psi |
| CD -Peak Load | 16.6 lbf |
| CD-Strain At Break | 478% |
| CD-Strain At Yield | 14.2% |
| CD -Stress At Yield | 1678 psi |

TABLE 3

| Tensile Machine Direction (MD). | |
| --- | --- |
| MD-Break Stress | 2105 psi |
| MD-Peak Load | 19.3 lbf |
| MD-Strain At Break | 453% |
| MD-Strain At Yield | 15.5% |
| MD-Stress At Yield | 1629 psi |

Having the properties explained above, the films were produced via Alpine extruders equipped with groove-fed feed sections, a barrel with a 30/1 L/D ratio; a barrier screw, and an Alpine air ring. The extrusion line had a 250 mm die with internal bubble cooling. The extrusion line also had a film thickness gauge scanner. The film fabrication conditions are as follows: 9.0 mil film thickness; blow-up ratio (BUR) 2.39; die gap 2 mm; and frost line height (FLH) 34 inch, at a output rate of approximately 400 lbs. per hour and an approximately 450 degree Fahrenheit polymer melt temperature.

A simulation was used to observe the thickness reduction and strain field of each silo bag after filling the bag with grains. A Mohr-Coulomb model was used to simulate the grains flow in the bag due to gravity under quasi static loading. The contact between the grains and the bag and the bag and the rigid floor was modeled using the "general contact" interaction parameters. For the Mohr-Coulomb model, the parameters used pertained to a generic granular material with exhibit low cohesion behavior.

Example 1—Uniform Thickness Silo Bag Design (Control Case)

In Example 1, Sample 1 was a silo bag having a uniform bag thickness of 230 μm. The silo bag material properties and grain properties of Sample 1 were modeled according to the parameters described in Tables 1-3.

Figure 2A:
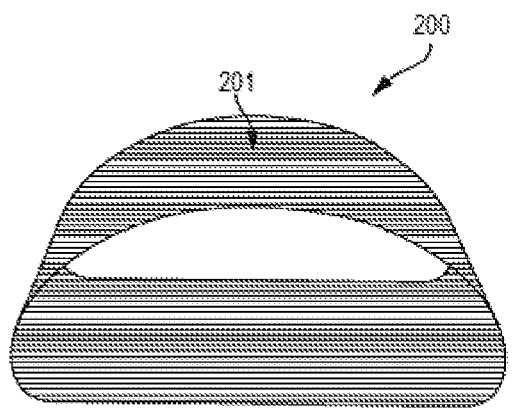
FIG. 2A is a modeled silo bag having uniform thickness prior to deformation.
Figure 2B:
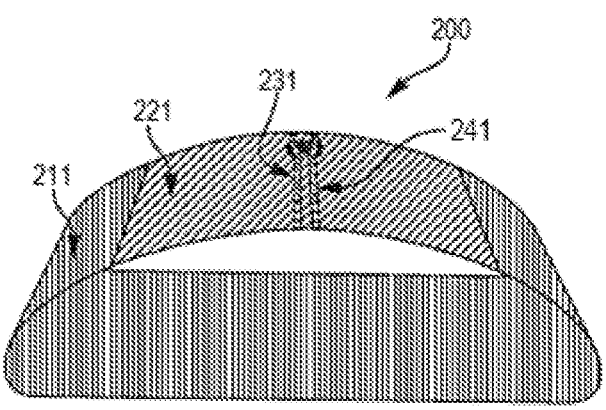
FIG. 2B is a modeled silo bag originally having uniform thickness after deformation.
Figure 2C:
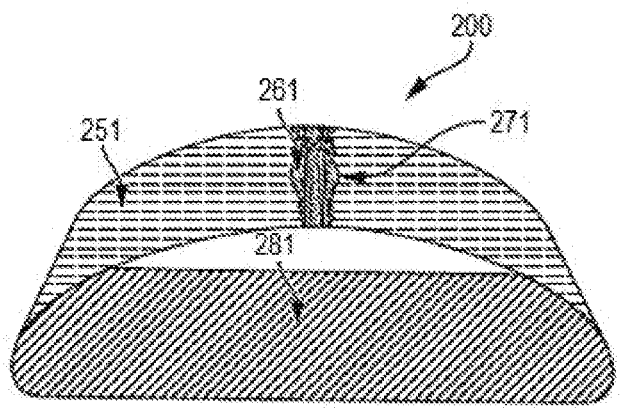
FIG. 2C is a modeled silo bag originally having uniform thickness after deformation.

The final thickness and strain field of Sample 1 post-deformation are shown in FIGS. 2B and 2C, respectively. FIG. 2B shows the thickness of Sample 1 after deformation for four sub-regions (Region 211 with a thickness of about 221 μm, Region 221 with a thickness of about 213 μm, and Regions 231 and 241 with a thickness of about 137 μm). The thickness reduction results are summarized in Table 4:

TABLE 4

| Thickness Reduction of Sample 1. | | |
| --- | --- | --- |
| Initial Film Thickness | Deformed Film Thickness | Thickness Reduction |
| Region 201 - 230 μm | Region 211 - 221 μm | 9 μm (4% reduction) |
| | Region 221 - 213 μm | 17 μm (7% reduction) |
| | Region 231 - 137 μm | 93 μm (40% reduction) |
| | Region 241 - 137 μm | 93 μm (40% reduction) |

As shown by the results presented in Table 4, after deformation, Sample 1 showed a thickness reduction of approximately 40% of the initial thickness in Regions 231 and 241.

The strain field of Sample 1 was also observed post-deformation, as shown in FIG. 3C. The strain field results for Sample 1 are provided in Table 5:

TABLE 5

Strain Field of Sample 1.

| Region | Strain |
|---|---|
| Region 251 | 8.6% |
| Region 261 | 13% |
| Region 271 | 13% |
| Region 281 | 52% |

As shown in FIG. 2C and Table 5, the maximum strain on the post-deformation bag of Sample 1 was approximately 52% (Region 281). As such, there was necking observed in the deformed bag of Sample 1, which originally had a uniform thickness of 230 µm prior to deformation.

Example 2—Non-Uniform Thickness Silo Bag Design with Constant Thickness Difference of 14%

In Example 1, a silo bag was modeled having non-uniform thickness according to embodiments described herein (Sample 2). The silo bag material properties and grain properties of Sample 2 were modeled according to the parameters described above and in Tables 1-3. The overall mass of Sample 2 was the same as Sample 1.

Figure 3A:
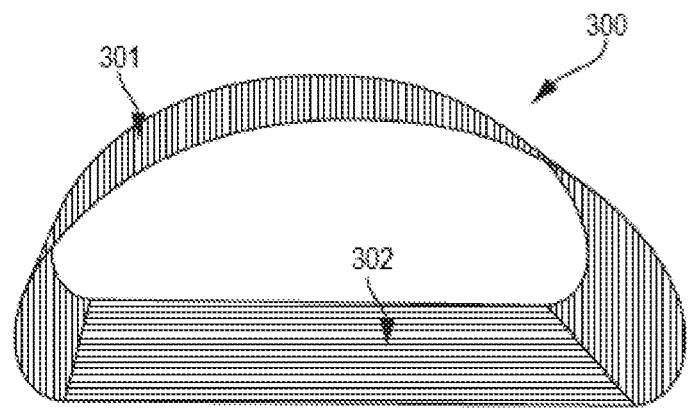
FIG. 3A is a modeled silo bag having non-uniform thickness prior to deformation.

FIG. 3A shows Sample 2 (a silo bag with a non-uniform thickness) before being filled with grains. As shown in FIG. 3A, the first region 301 of Sample 1 had a thickness of about 240 µm, and the second region 302 of Sample 1 had a thickness of about 210 µm. Overall, there was a thickness difference of approximately 14% between the first region 301 and the second region 302.

Figure 3B:
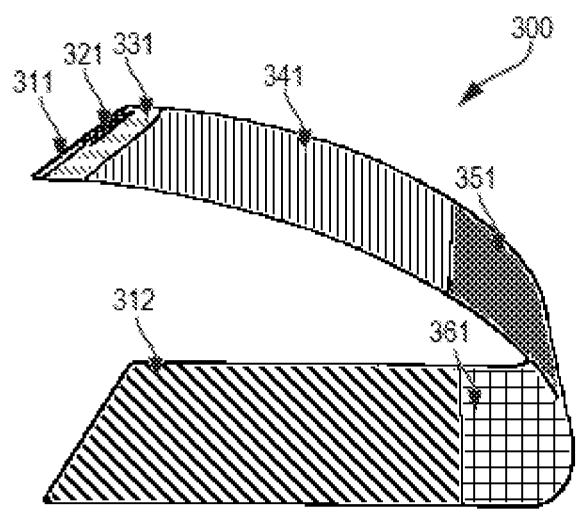
FIG. 3B is a half-view a modeled silo bag of non-uniform thickness after deformation showing the thickness reduction.

The final thickness of Sample 2 post-deformation is shown in FIG. 3B. FIG. 3B shows the thickness of Sample 2 after deformation for seven sub-regions. The thickness reduction results are summarized in Table 6:

TABLE 6

Thickness Reduction of Sample 2.

| Initial Film Thickness | Deformed Film Thickness | Thickness Reduction |
|---|---|---|
| Region 301 - 240 µm | Region 311 - 194 µm | 46 µm (19% reduction) |
|  | Region 321 - 185 µm | 55 µm (22% reduction) |
|  | Region 331 - 215 µm | 25 µm (10% reduction) |
|  | Region 341 - 224 µm | 16 µm (7% reduction) |
|  | Region 351 - 228 µm | 12 µm (5% reduction) |
|  | Region 361 - 233 µm | 7 µm (3% reduction) |
| Region 302 - 210 µm | Region 312 - 200 µm | 10 µm (5% reduction) |

As shown by the results presented in Table 6, after deformation, Sample 2 had a maximum thickness reduction of approximately 22% of the initial thickness for region 301. As such, because the thickness reduction was less than 30% there was no failure observed Sample 2.

Example 3—Non-Uniform Thickness Silo Bag Design with Constant Thickness Difference of 31.5%

In Example 3, a silo bag was modeled having non-uniform thickness according to embodiments described herein (Sample 3). The silo bag material properties and grain properties of Sample 3 were modeled according to the parameters described above and in Tables 1-3. The overall mass of Sample 3 was the same as Sample 1.

Figure 4A:
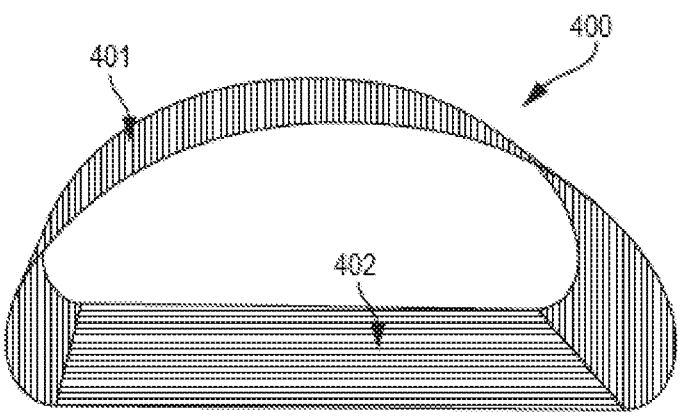
FIG. 4A is a modeled silo bag having non-uniform thickness prior to deformation.

FIG. 4A shows Sample 3 (a silo bag with a non-uniform thickness) before being filled with grains. As shown in FIG. 4A, the first region 401 of Sample 3 had a thickness of about 250 micrometers (µm), and the second region 402 of Sample 1 had a thickness of about 193 µm. Overall, there was a thickness difference of approximately 31.5% between the first region 401 and the second region 402.

Figure 4B:
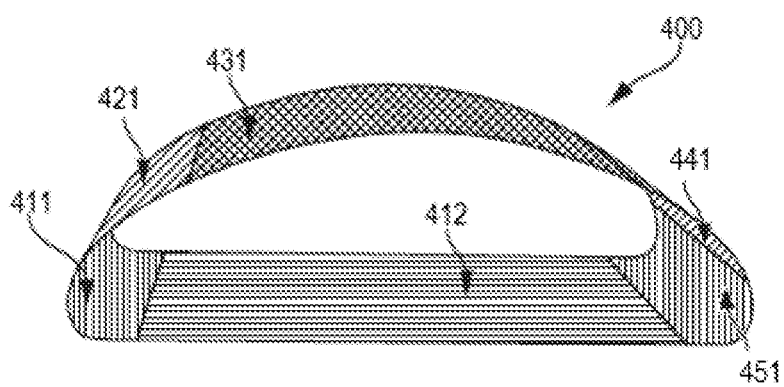
FIG. 4B is a modeled silo bag of non-uniform thickness after deformation showing the thickness reduction.

The final thickness of Sample 3 post-deformation is shown in FIG. 4B. FIG. 4B shows the thickness of Sample 3 after deformation for six sub-regions. The thickness reduction results are summarized in Table 7:

TABLE 7

Thickness Reduction of Sample 3.

| Initial Film Thickness | Deformed Film Thickness | Thickness Reduction |
|---|---|---|
| Region 401 - 250 µm | Region 411 - 240 µm | 10 µm (4% reduction) |
|  | Region 421 - 235 µm | 15 µm (6% reduction) |
|  | Region 431 - 228 µm | 22 µm (9% reduction) |
|  | Region 441 - 235 µm | 15 µm (6% reduction) |
|  | Region 451 - 240 µm | 10 µm (4% reduction) |
| Region 402 - 193 µm | Region 412 - 180 µm | 13 µm (7% reduction) |

As shown by the results presented in Table 4, after deformation, Sample 3 had a maximum thickness reduction of approximately 9% of the initial thickness of region 401.

Figure 4C:
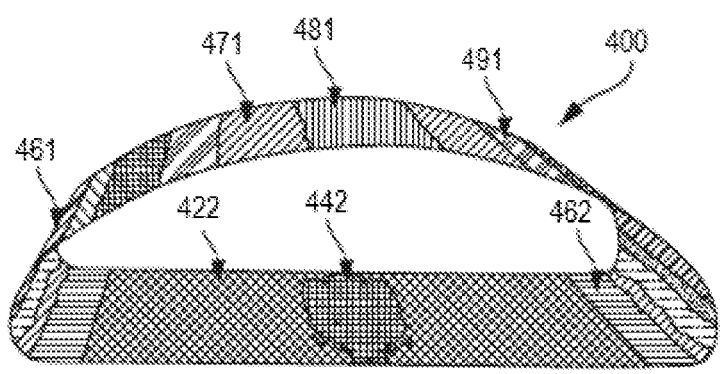
FIG. 4C is a modeled silo bag of non-uniform thickness after deformation showing the strain field.

The strain field of Sample 3 was also observed post-deformation, as show in FIG. 4C. The strain field results are provided in Table 8:

TABLE 8

Strain Field of Sample 3.

| Region | Strain |
|---|---|
| Region 461 | 8.2% |
| Region 471 | 11% |
| Region 481 | 12% |
| Region 491 | 11% |
| Region 422 | 10% |
| Region 442 | 9.5% |
| Region 462 | 4.3% |

As shown in FIG. 4C and Table 8, the maximum strain on the post-deformation bag of Sample 3 was approximately 12% (Region 481) and the minimum strain was approximately 4.3% (Region 462). As such, there was no necking observed in the deformed silo bag of Sample 3.

Example 4—Non-Uniform Thickness Silo Bag Design with Variable Thickness Difference of 36%

In Example 4, a silo bag was modeled having non-uniform thickness according to embodiments described herein (Sample 4). The silo bag material properties and grain properties of Sample 4 were modeled according to the parameters described above and in Tables 1-3. The overall mass of Sample 4 was the same as Sample 1.

Figure 5A:
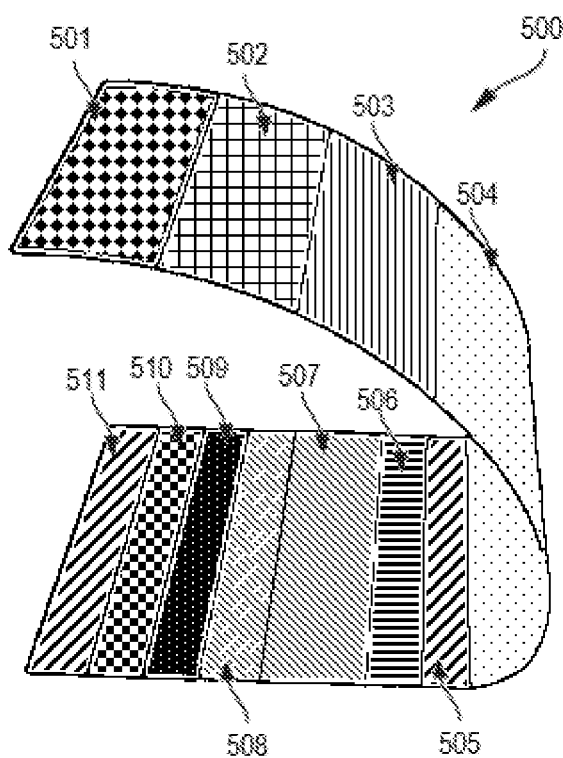
FIG. 5A is a half-view modeled silo bag having non-uniform thickness prior to deformation.

FIG. 5A shows Sample 4 (a silo bag with a non-uniform thickness) before being filled with grains. As shown in FIG. 5A, the thickness of Sample 4 decreases from a first region (501) to a tenth region (510). Prior to deformation, the first region 501 of Sample 4 had a thickness of about 260 µm, and the tenth region 310 of Sample 4 had a thickness of about 190 µm. Overall, there was a thickness difference of approximately 36% between the first region 501 and the tenth region 510.

Figure 5B:
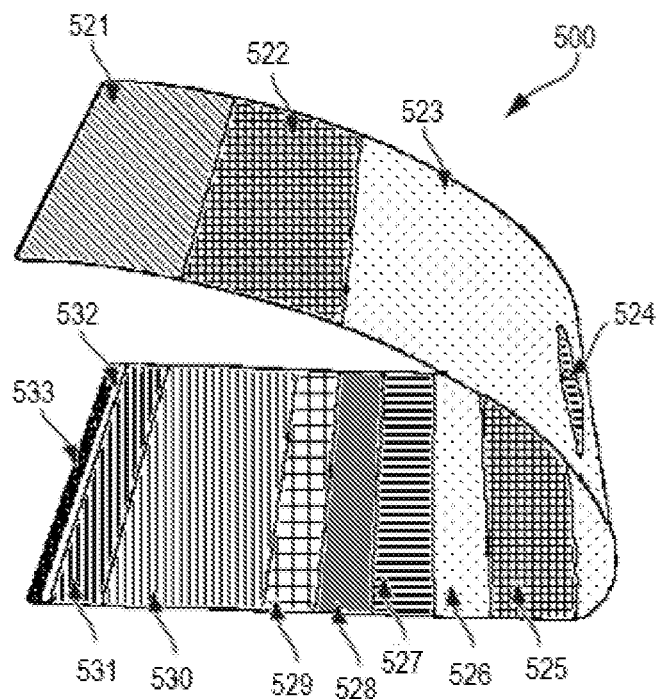
FIG. 5B is a half-view modeled silo bag of non-uniform thickness after deformation showing the thickness reduction.

The final thickness of Sample 4 post-deformation is shown in FIG. 5B. FIG. 5B shows the thickness of Sample 4 after deformation for thirteen sub-regions. The thickness reduction results are summarized in Table 9:

TABLE 9

Thickness Reduction of Sample 4.

| Initial Film Thickness | Deformed Film Thickness | Thickness Reduction |
|---|---|---|
| Region 501 - 260 μm | Region 521 - 243 μm | 17 μm (7% reduction) |
| Region 502 - 250 μm | Region 522 - 236 μm | 14 μm (6% reduction) |
| Region 503 - 245 μm | Region 523 - 230 μm | 15 μm (6% reduction) |
|  | Region 524 - 223 μm | 22 μm (9% reduction) |
| Region 504 - 240 μm | Region 525 - 217 μm | 23 μm (10% reduction) |
| Region 505 - 235 μm | Region 526 - 210 μm | 25 μm (11% reduction) |
| Region 506 - 230 μm | Region 527 - 204 μm | 26 μm (11% reduction) |
| Region 507 - 218 μm | Region 528 - 197 μm | 21 μm (10% reduction) |
| Region 508 - 212 μm | Region 529 - 191 μm | 21 μm (10% reduction) |
| Region 509 - 205 μm | Region 530 - 185 μm | 20 μm (10% reduction) |
| Region 510 - 200 μm | Region 531 - 178 μm | 22 μm (11% reduction) |
| Region 511 - 190 μm | Region 532 - 172 μm | 18 μm (10% reduction) |
|  | Region 533 - 165 μm | 25 μm (13% reduction) |

As shown by the results presented in Table 9, after deformation, Sample 4 showed a thickness reduction of approximately 13% of the initial thickness in Region 533.

Example 5—Non-Uniform Thickness Silo Bag Design with Constant Thickness Difference of 6.3%

In Example 5, a silo bag was modeled having non-uniform thickness according to embodiments described herein (Sample 5). The silo bag material properties and grain properties of Sample 5 were modeled according to the parameters described above and in Tables 1-3. The overall mass of Sample 5 was the same as Sample 1.

Figure 6A:
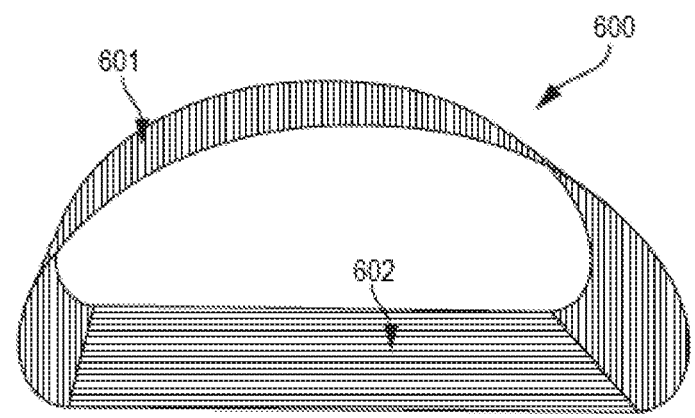
FIG. 6A is a modeled silo bag having non-uniform thickness prior to deformation.

FIG. 6A shows Sample 5 (a silo bag with a non-uniform thickness) before being filled with grains. As shown in FIG. 6A, the first region 601 of Sample 1 had a thickness of about 235 μm, and the second region 602 of Sample 1 had a thickness of about 220 μm. Overall, there was a thickness difference of approximately 6.3% between the first region 601 and the second region 602.

Figure 6B:
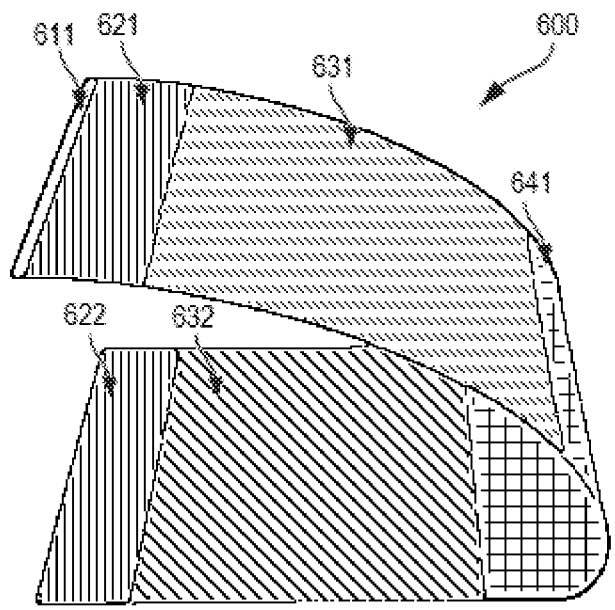
FIG. 6B is a half-view modeled silo bag of non-uniform thickness after deformation showing the thickness reduction.

The final thickness of Sample 5 post-deformation is shown in FIG. 6B. FIG. 6B shows the thickness of Sample 5 after deformation for six sub-regions. The thickness reduction results are summarized in Table 10:

TABLE 10

Thickness Reduction of Sample 5.

| Initial Film Thickness | Deformed Film Thickness | Thickness Reduction |
|---|---|---|
| Region 601 - 235 μm | Region 611 - 158 μm | 77 μm (33% reduction) |
|  | Region 621 - 210 μm | 25 μm (11% reduction) |
| Region 602 - 220 μm | Region 631 - 218 μm | 17 μm (7% reduction) |
|  | Region 641 - 227 μm | 8 μm (3% reduction) |
|  | Region 622 - 210 μm | 10 μm (5% reduction) |
|  | Region 632 - 205 μm | 15 μm (7% reduction) |

As shown by the results presented in Table 10, after deformation, Sample 5 showed a thickness reduction of approximately 33% of the initial thickness in Region 611.

Example 6—Non-Uniform Thickness Silo Bag Design with Constant Thickness Difference of 45%

In Example 6, a silo bag was modeled having non-uniform thickness according to embodiments described herein (Sample 6). The silo bag material properties and grain properties of Sample 6 were modeled according to the parameters described above and in Tables 1-3. The overall mass of Sample 6 was the same as Sample 1.

Figure 7A:
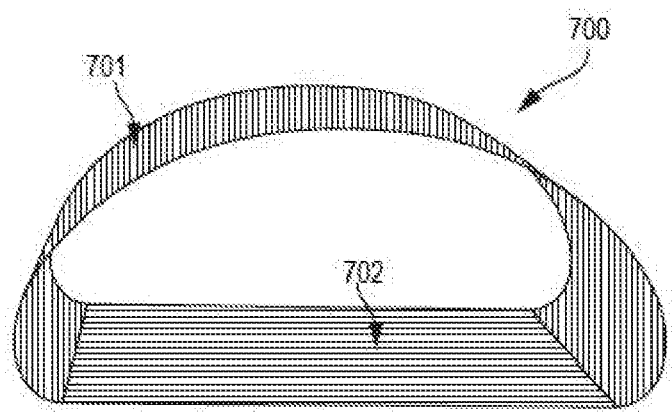
FIG. 7A is a modeled silo bag having non-uniform thickness prior to deformation.

FIG. 7A shows Sample 2 (a silo bag with a non-uniform thickness) before being filled with grains. As shown in FIG. 7A, the first region 701 of Sample 6 had a thickness of about 258 μm, and the second region 302 of Sample 6 had a thickness of about 177 μm.

Figure 7B:
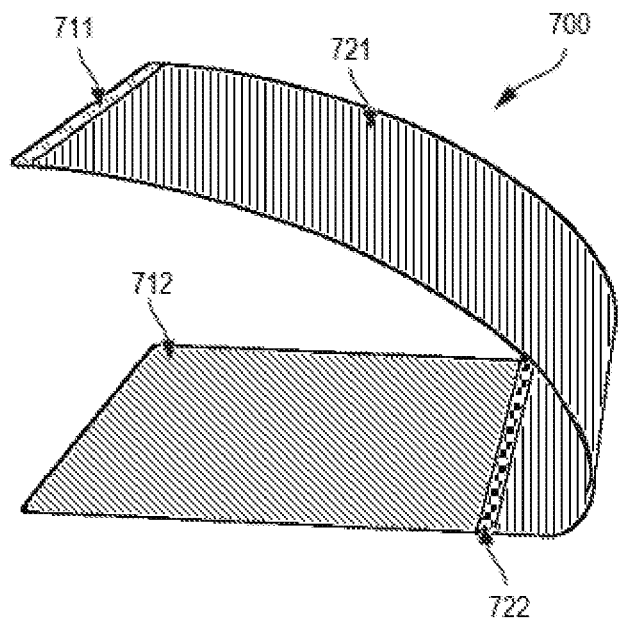
FIG. 7B is a half-view modeled silo bag of non-uniform thickness after deformation showing the thickness reduction.

The final thickness of Sample 6 post-deformation is shown in FIG. 7B. FIG. 7B is a half-view of the modeled silo bag, showing the thickness of Sample 6 after deformation for 4 sub-regions. The thickness reduction results are summarized in Table 11:

TABLE 11

Thickness Reduction of Sample 6.

| Initial Film Thickness | Deformed Film Thickness | Thickness Reduction |
|---|---|---|
| Region 701 - 258 μm | Region 711 - 230 μm | 28 μm (11% reduction) |
|  | Region 721 - 253 μm | 5 μm (2% reduction) |
| Region 702 - 177 μm | Region 712 - 94 μm | 83 μm (47% reduction) |
|  | Region 722 - 174 μm | 3 μm (2% reduction) |

As shown by the results presented in Table 11, after deformation, Sample 6 showed a thickness reduction of approximately 47% of the initial thickness in Region 712.

Example 7—Comparison of Thickness Reduction for Samples 1-6

For a comparison of Samples 1-6, Table 12 provides a summary of the thickness reduction results explained in Examples 1-6.

TABLE 12

Comparison of Thickness Reduction for Samples 1-6

| Sample | Uniform/Non-uniform Thickness | Thickness Difference | Greatest Thickness Reduction after Deformation | Failure |
|---|---|---|---|---|
| Sample 1 | Uniform thickness | N/a | 40% | Yes |
| Sample 2 | Non-uniform thickness; Constant thickness in first region (top region) | 14% (difference between first region (top region) and second region (bottom region)) | 22% | No |

TABLE 12-continued

Comparison of Thickness Reduction for Samples 1-6

| Sample | Uniform/Non-uniform Thickness | Thickness Difference | Greatest Thickness Reduction after Deformation | Failure |
|---|---|---|---|---|
| Sample 3 | Non-uniform thickness; Constant thickness in first (top) region | 31.5% (difference between first region (top region) and second region (bottom region)) | 9% | No |
| Sample 4 | Non-uniform thickness; Thickness gradually decreased from top to bottom of silo bag | 36% (difference between top and bottom regions of silo bag) | 14% | No |
| Sample 5 | Non-uniform thickness; Constant thickness in first (top) region | 6.3% (difference between first region (top region) and second region (bottom region)) | 33% | Yes |
| Sample 6 | Non-uniform thickness; Constant thickness in first (top) region | 45% (difference between first region (top region) and second region (bottom region)) | 47% | Yes |

As shown in Table 12, after deformation, Sample 1 having a uniform thickness showed failure from severe necking with a thickness reduction of approximately 40%. As stated previously in this disclosure, silo bags with a thickness reduction of greater than approximately 30% may result in tear and puncture failures. In general, it was observed that silo bags having non-uniform thickness (Samples 1-5) generally showed a lower thickness reduction than the silo bag having uniform thickness (Sample 1). However, as observed with Samples 5 and 6, if the thickness difference is less than approximately 10% (Sample 5) or greater than 40% (Sample 6) between the first region (with a constant thickness) and second region (with a constant thickness), the silo bag may become susceptible to necking, tear, and puncture failures. Therefore, Samples 2-4, representing embodiments of the present disclosure, provide silo bags having relatively less thickness reduction. As such, embodiments of the present disclosure may provide improved creep performance or improved load bearing performance, which may be important for functionality in various applications.

Example 8—Comparison of Strain Fields Observed for Sample 1 and Sample 3

To compare Samples 1 and 3, Table 13 provides a summary of the strain field results explained in Examples 1 and 3.

TABLE 13

Comparison of Strain Fields for Samples 1 and 3

| Sample | Uniform/Non-uniform Thickness | Maximum Strain | Necking |
|---|---|---|---|
| Sample 1 | Uniform thickness | 52% | Yes |
| Sample 3 | Non-uniform thickness; Constant thickness in first (top) region | 12% | No |

As shown in the strain fields for Samples 1 and 3, the silo bags having uniform thickness (Sample 1) had necking and higher strain as compared to Sample 3, a silo bag having non-uniform thickness. Moreover, even though the two Samples had the same overall mass, the silo bags having non-uniform thickness (Sample 3) showed improved performance compared to the silo bags having uniform thickness (Sample 1). As such, embodiments of the present disclosure may provide silo bags with improved strength, as compared to conventional silo bags with uniform thickness, without requiring additional materials.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A multilayer silo bag comprising:
a tube comprising at least two layers, the tube having a first open end, a second open end, and a first region disposed between the first and second end and a second region disposed between the first and second end,
wherein each of the at least two layers comprises an ethylene/alpha-olefin interpolymer having a density of 0.90 g/cc to 0.965 g/cc when measured according to ASTM D792 and a melt index ($I_2$) of 0.1 to 6.0 g/10 minutes when measured according to ASTM D1238, a low density ethylene-based polymer having a density of 0.917 g/cc to 0.935 g/cc and melt index ($I_2$) of 0.1 to 2.0 g/10 minutes, or combinations thereof;
wherein the first region has a thickness of at least 10% greater than a thickness of the second region;
wherein the first region has a surface area that is at least 65% of an overall surface area of the multilayer silo bag; and
wherein the tube has an overall thickness of 50 micrometers (μm) to 350 μm.

2. The multilayer silo bag of claim 1, wherein the interpolymer is a linear low density ethylene-based polymer.

3. The multilayer silo bag of claim 1, wherein the first region has a thickness 10% to 40% greater than a thickness of the second region.

4. The multilayer silo bag of claim 1, wherein the first region has a thickness of 50 μm to 350 μm.

5. The multilayer silo bag of claim 1, wherein the second region has a thickness of 50 μm to 350 μm.

6. The multilayer silo bag of claim 1, wherein the multilayer silo bag comprises at least 10 wt. % low density ethylene-based polymer.

7. The multilayer silo bag of claim 1, wherein the multilayer silo bag comprises 10 wt. % to 60 wt. % low density ethylene-based polymer.

8. The multilayer silo bag of claim 2, comprises at least 40 wt. % linear low density ethylene-based polymer.

9. The multilayer silo bag of claim 2, wherein the multilayer silo bag comprises 40 wt. % to 95 wt. % linear low density ethylene-based polymer.

10. A method of using the multilayer silo bag of claim 1, wherein filling the multilayer silo bag causes the thickness of the first region to decrease by less than 15%.

11. A method of manufacturing a multilayer silo bag, the method comprising:
    forming a multilayer layer blown film bubble, wherein the multilayer layer blown film bubble comprises at least two layers,
        wherein each of the at least two layers comprises an ethylene/alpha-olefin interpolymer having a density of 0.90 g/cc to 0.965 g/cc and a melt index ($I_2$) of 0.1 to 6.0 g/10 minutes, a low density ethylene-based polymer having a density of 0.917 g/cc to 0.935 g/cc and melt index ($I_2$) of 0.1 to 2.0 g/10 minutes, or combinations thereof; and
    cutting the multilayer blown film bubble to form the multilayer silo bag of claim 1.

12. The method of claim 11, wherein forming the multilayer blown film tube comprises extruding the multilayer layer blown film bubble through a die.

13. The method of claim 12, wherein extruding the multilayer layer blown film bubble through the die comprises offsetting the center of the die.

14. The method of claim 11, further comprising laminating a second film onto at least a portion of the surface of the multilayer silo bag.

15. The method of claim 11, further comprising folding the multilayer silo bag.

* * * * *